United States Patent [19]

Harrison

[11] 4,268,963

[45] May 26, 1981

[54] HAND TOOLS

[75] Inventor: Christopher R. B. Harrison, Porthcawl, Wales

[73] Assignee: Wilkinson Sword, Ltd., Buckinghamshire, England

[21] Appl. No.: 73,443

[22] Filed: Sep. 7, 1979

[30] Foreign Application Priority Data

Sep. 9, 1978 [GB] United Kingdom ............... 36286/78

[51] Int. Cl.³ .............................................. B26B 13/00
[52] U.S. Cl. ...................................................... 30/262
[58] Field of Search ................ 30/262, 261, 271, 341; 81/321, 322, 323, DIG. 9

[56] References Cited

U.S. PATENT DOCUMENTS

| | | | |
|---|---|---|---|
| 2,072,140 | 3/1937 | Smith | 30/260 |
| 3,894,336 | 7/1975 | Desimone | 30/341 |
| 4,073,059 | 2/1978 | Wallace | 30/262 X |
| 4,079,514 | 3/1978 | Arlett | 30/261 |

*Primary Examiner*—Jimmy C. Peters

[57] ABSTRACT

The hand tool comprises two members, for example male and female blade members in the case of a garden pruner, each formed with a tang portion which extends within a handle. For locking the members in a closed position, a catch pin is slidable in a slot of one member to engage a recess in the other member. The catch pin has enlarged head and foot portions which enable the pin to be inserted into an enlarged end portion of the slot before fitting the members together, and the overlap of the assembled members prevents movement of the pin into the enlarged slot portion after assembly, and so retains the pin in the slot.

Mutually opposite recesses in the tang portions of the members assist in retaining the handles on such tang portions and form seatings for a barrel spring by which the handles are urged apart.

3 Claims, 7 Drawing Figures

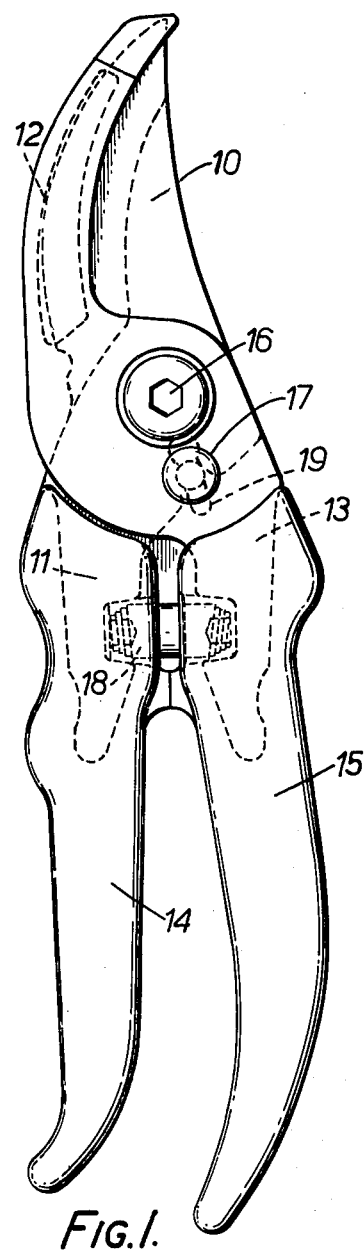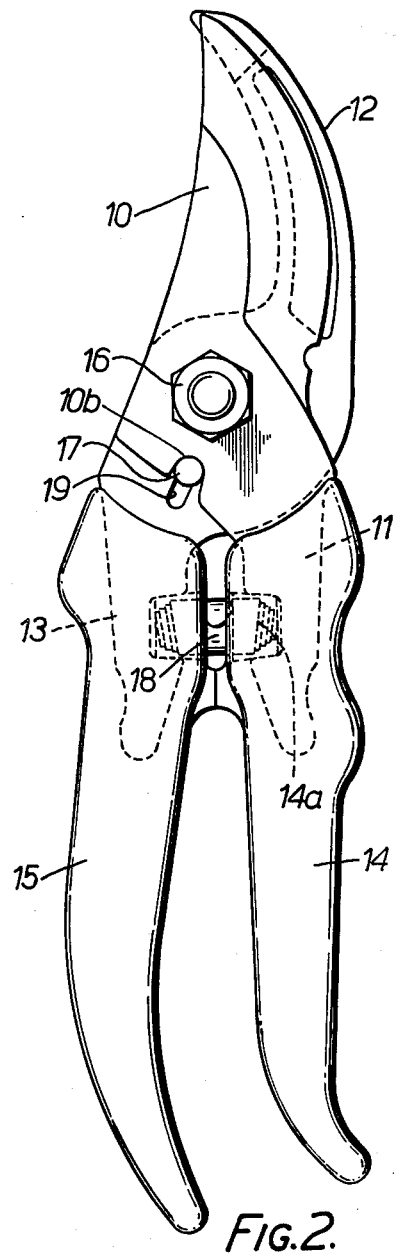

ary to slightly close the pruners before the catch can be released.

HAND TOOLS

BACKGROUND OF THE INVENTION

This invention relates to hand tools comprising two cooperating members which are arranged to be moved relatively to one another by handles which are connected to the respective cooperating members. In particular the invention is applied to garden pruners and considerable research and development work is directed in this field to reducing manufacturing costs, and providing flexible designs which permit substantial variation of the finished product by the use of interchangeable parts.

BRIEF SUMMARY OF THE INVENTION

According to one aspect, the present invention provides a hand tool comprising two cooperating members, two handles each secured to a separate one of said members, means interconnecting the members in mutually overlapping relationship to permit movement of the members relatively to one another by said handles, means defining an elongate slot in one of said members, the slot having a portion thereof which is enlarged in relation to the width of the remainder of the slot, a catch pin having a head portion of a size greater than said enlarged portion of the slot, a foot portion of a size to enable it to pass through the enlarged portion of the slot but not through the remainder of the slot and a shank portion interconnecting the head portion and foot portion and of a size to fit slidingly within the remainder of the slot, the catch pin being insertable into the slot before assembly of the tool, the other of said members having a recess in one edge thereof into which the catch pin can engage to lock the members against relative movement, the members in their assembled state overlapping to mask at least part of said enlarged portion of the slot and thereby prevent removal of the catch pin from the slot.

According to another aspect, the present invention provides a hand tool comprising two cooperating members, two handles each secured to a separate one of said members and means interconnecting the members in mutually overlapping relationship to permit movement of the members relatively to one another by said handles, each said member having a tang portion, each tang portion having a recess therein disposed opposite the recess of the other member, each handle extending into the recess of the tang portion to assist in locking the handle to the tang portion.

BRIEF DESCRIPTION OF THE DRAWINGS

One example of hand tool according to the invention, in the form of a garden pruner, is illustrated in the accompanying drawings in which:

FIG. 1 is a plan view of the front of the pruner;

FIG. 2 is a plan view of the back of the pruner;

DESCRIPTION OF PREFERRED EMBODIMENTS

Figure 3:
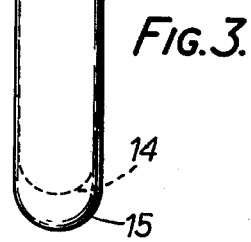
FIG. 3 is an elevation of one side of the pruner.

The pruner shown in the drawings is of known construction insofar as it comprises a male blade 10 and integral tang 11, a female blade 12 and integral tang 13, handles 14 and 15 secured respectively to the tangs 11,13, a pivot bolt and nut assembly 16 pivotally interconnecting the two blades in face to face relationship, a catch pin 17 mounted in the blade and handle assembly 12,15 for engagement with the other blade and handle assembly 10,14 to lock the blades together in the closed position, and a spring 18 for biasing blades to an open position. The pruners illustrated in the drawing differ however from existing pruners in a number of constructional details which will be discussed below.

Figure 7:
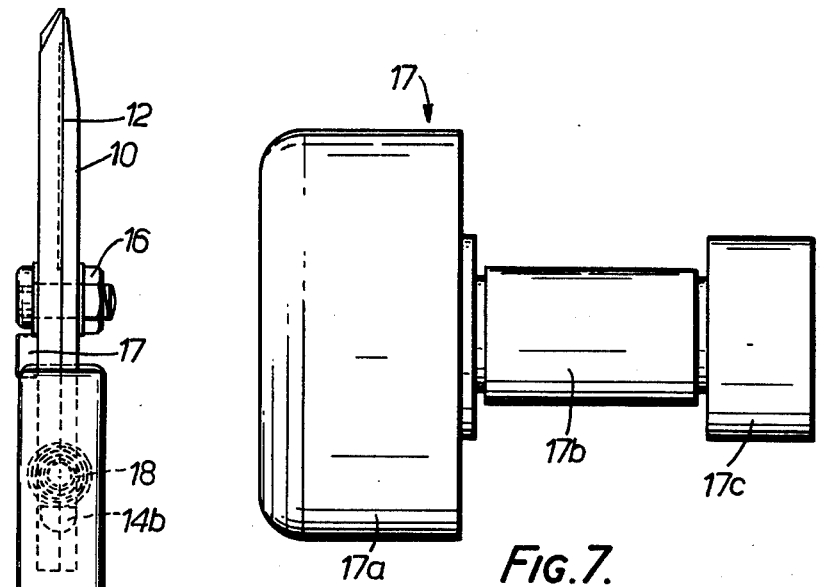
FIG. 7 is a side elevation of a catch pin for locking the female and male blades in the closed position.

Considering first the catch pin 17, it will be seen from FIG. 7 that this comprises a circular head portion 17a, a circular section shank portion 17b and a circular section foot portion 17c, the diameter of the foot portion being larger than that of the shank portion but smaller than that of the head portion. The length of the shank portion 17b will be equal to the thickness of the metal forming the female blade and tank assembly plus the space for a spring washer. The three portions of the catch pin will normally be turned from a single length of bar.

Figures 4, 5:
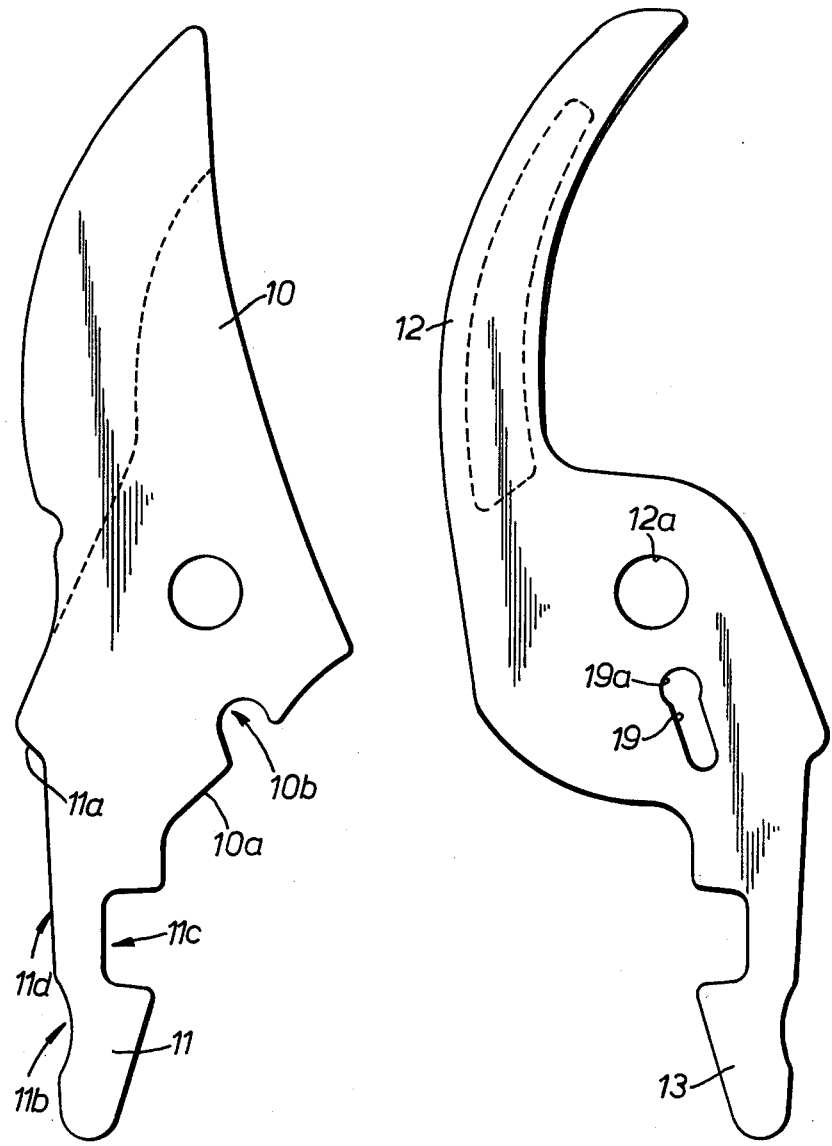
FIG. 4 is a plan view of a male blade and integral tang of the pruner.
FIG. 5 is a plan view of a female blade and integral tang of the pruner.

After fitting of a spring washer (not shown) below the head portion 17a, the catch pin 17 is inserted into a keyhole slot 19 (see FIG. 5) formed in the female blade and extending substantially radially with respect to a hole 12a in the blade for receiving the pivot bolt assembly. The width of the slot is such as to receive the shank portion 17b of the catch pin 17 in a sliding fit but the slot has an enlargement 19a, at its end nearest the pivot bolt hole 12a, of a size to allow the foot portion 17c of the catch pin to pass therethrough. In assembly of the catch pin in the female blade, the foot portion is inserted through the enlarged end 19a of the slot to locate the shank portion 17b within the slot, and the catch pin is then moved away from the enlarged end portion 19a so that the shank portion 17b forms a sliding fit in the slot. The male blade is so shaped as to provide a back edge 10a which, when the male blade has been assembled on the female blade, traverses the slot 19. This edge of the male blade contains a recess 10b into which the foot portion 17c of the catch pin can engage when the blades are in their closed position, in order to lock them in this position. In the locked position of the blades however, the foot portion 17c of the catch pin is spaced from the enlarged end portion 19a of the slot 19 (see FIG. 1) so that, after assembly, the catch pin remains locked within the slot and cannot be removed therefrom without disassembling the blades of the pruner. The edge 10a of the male blade is so shaped that, over the permitted range of movement of the blades, it does not interfere with the catch pin when the catch pin has been moved to the radially outer end of the slot 19. However, the back edge 10a of blade 10, at a point thereon on the side of recess 10b remote from tang 11, acts as a stop for the catch pin defining the maximum open position of the blades. If desired the recess 10b in the edge 10a can be stepped to provide a restricted range of opening for the blades. Preferably recess 10b is slightly undercut on one side, as shown, to form a safety lock, making it necessary to slightly close the pruners before the catch can be released.

The tangs 11 and 13 are of similar shape and construction and therefore only one of them need be discussed. Considering tang 11 on male blade 10, it will be seen from FIG. 4 that a shoulder 11a is formed on the forward edge of the tang, i.e. on the edge which forms a continuation of the blade cutting edge, and a recess 11b is formed on the same edge adjacent its tip. On the rearward edge of the tang there is a rectangular shaped cut-out 11c located in a portion of the tang intermediate the shoulder 11a and recess 11b.

These configurations of the tang facilitate fitting of various handles to the tang. Thus the handle can be a sleeve formed from pressed steel or by forging and fitted over the tang until it abuts against the shoulder 11a, the handle being held in position by rivetting or spot welding. The internal shape of the handle will be such as to fit closely around the tang.

The sleeve will be open or cut away in the portion thereof which registers with the cut-out 11c of the tang and this cut-out can be used to receive one end of a barrel spring by means of which the blades are urged apart, as seen in FIGS. 1 and 2.

As an alternative, the handle can be a diecasting, and in this event, the flat surface 11d between shoulder 11a and recess 11b, and continuing for a short distance on the opposite side of recess 11b, provides a location surface for the handle.

Figure 6:
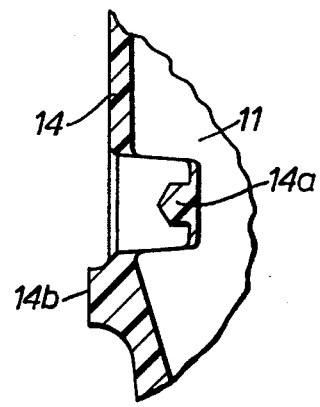
FIG. 6 is a sectional detail of the tang which is integral with the female blade and part of a handle secured to the tang.

As a further alternative, the handle can be moulded onto the tang in plastics material, and in this event the plastics material will flow into the recess 11b to key the handle to the tang. The mould in which the handle is formed is such as to leave a cup-shaped depression in the handle opposite and extending within the cut-out 11c (see FIG. 6) but with a portion of the handle projecting from the base of the depression to form a spigot 14a (FIGS. 2 and 6) on which the barrel shaped spring can be located. A cushion stop, in the form of an integral projection, such as 14b in FIG. 6, can be moulded into each handle.

What I claim is:

1. A hand tool comprising two cooperating members, two handles each secured to a separate one of said members, means interconnecting the members in mutually overlapping relationship to permit movement of the members relatively to one another by said handles, means defining an elongate slot in one of said members, the slot having a portion thereof which is enlarged in relation to the width of the remainder of the slot, a catch pin having a head portion of a size greater than said enlarged portion of the slot, a foot portion of a size to enable it to pass through the enlarged portion of the slot but not through the remainder of the slot and a shank portion interconnecting the head portion and foot portion and of a size to fit slidingly within the remainder of the slot, the catch pin being insertable into the slot before assembly of the tool, the other of said members having a recess in one edge thereof into which the catch pin can engage to lock the members against relative movement, the members in their assembled state overlapping to mask at least part of said enlarged portion of the slot and thereby prevent removal of the catch pin from the slot.

2. A hand tool comprising two cooperating members, two handles each secured to a separate one of said members and means interconnecting the members in mutually overlapping relationship to permit movement of the members relatively to one another by said handles, each said member having a tang portion of flat metal, each tang portion having a recess therein disposed opposite the tang portion of the other member, each handle having been molded in plastics material onto the tang portion of the associated member, and extending into the recess of the tang portion to assist in locking the handle to the tang portion and wherein each handle is molded in the vicinity of the said recess with a cup-shaped depression opposite and extending within the recess, each handle having a portion thereof projecting from the base of the depression and forming a spigot, and a barrel-shaped spring having opposite ends thereof extending with the depressions in the handles, and engaged over the respective spigots.

3. A garden pruner comprising two cooperating members at least one of which is a blade member, two handles each secured to a separate one of said members, a pivot bolt assembly interconnecting the members in mutually overlapping relationship to permit movement of the members relatively to one another by said handles, means defining an elongate slot in one of said members, the slot having a portion thereof which is enlarged in relation to the width of the remainder of the slot, a catch pin having a head portion of a size greater than said enlarged portion of the slot, a foot portion of a size to enable it to pass through the enlarged portion of the slot but oversized in relation to the remainder of the slot and a shank portion interconnecting the head portion and foot portion and of a size to fit slidingly within the remainder of the slot, the catch pin being insertable into the slot before assembly of the tool, the other of said members having a recess in one edge thereof into which the catch pin can engage to lock the members against relative movement, the members in their assembled state overlapping to mask at least part of said enlarged portion of the slot and thereby prevent removal of the catch pin from the slot, each said member having a tang portion, each tang portion having a recess therein disposed opposite the tang portion of the other member, each handle extending into the recess of the tang portion to assist in locking the handle to the tang portion, and a compression spring whose opposite ends are seated in the recesses of the tang portions of the members, the tang portions of the members being of flat metal and the handles having been moulded in plastics material on to the tang portions to leave openings in the handles opposite the recesses of the tang portions, the ends of said spring extending through said openings.

* * * * *